(12) United States Patent
Yang et al.

(10) Patent No.: US 12,388,314 B2
(45) Date of Patent: Aug. 12, 2025

(54) MOTOR

(71) Applicant: HYUNDAI MOBIS Co., Ltd., Seoul (KR)

(72) Inventors: Hye Seong Yang, Yongin-si (KR); Yeong Woo Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 618 days.

(21) Appl. No.: 17/536,694

(22) Filed: Nov. 29, 2021

(65) Prior Publication Data

US 2022/0200387 A1 Jun. 23, 2022

(30) Foreign Application Priority Data

Dec. 23, 2020 (KR) ........................ 10-2020-0182476

(51) Int. Cl.
*H02K 3/52* (2006.01)
*H02K 3/32* (2006.01)

(52) U.S. Cl.
CPC ............ *H02K 3/522* (2013.01); *H02K 3/325* (2013.01); *H02K 2203/09* (2013.01); *H02K 2203/12* (2013.01)

(58) Field of Classification Search
CPC .... H02K 1/148; H02K 3/522; H02K 2203/09; H02K 2203/12
See application file for complete search history.

(56) References Cited

U.S. PATENT DOCUMENTS

| 6,470,984 B1 * | 10/2002 | Nakajima | H02K 5/225 903/952 |
| 2014/0015358 A1 * | 1/2014 | Wan | H02K 3/522 310/198 |

FOREIGN PATENT DOCUMENTS

| KR | 10-2017-0011144 A | 2/2017 |
| KR | 10-2018-0127799 A | 11/2018 |
| KR | 10-2018-0132331 A | 12/2018 |
| KR | 10-2288301 | 8/2021 |

OTHER PUBLICATIONS

Office Action dated Nov. 11, 2024, issued in corresponding Korean Patent Application No. 10-2020-0182476.
Notice of Allowance issued corresponding Korean Patent Application No. 10-2020-0182476 dated May 30, 2025, with English translation.
Notice of Allowance issued corresponding Korean Patent Application No. 10-2020-0182476 dated May 30, 2025.

* cited by examiner

*Primary Examiner* — Ramon M Barrera
(74) *Attorney, Agent, or Firm* — MORGAN, LEWIS & BOCKIUS LLP

(57) ABSTRACT

The present disclosure relates to a motor including: a stator including a plurality of split cores configured to collectively define a ring shape, and bobbins configured to respectively surround the plurality of split cores and each having a coil wound therearound; a busbar unit electrically connected to the coils; and support parts respectively disposed on the bobbins and configured to support the busbar unit, thereby improving durability, stability, and reliability.

15 Claims, 10 Drawing Sheets

MOTOR

CROSS-REFERENCE TO RELATED APPLICATION

This application claims priority to and the benefit of Korean Patent Application No. 10-2020-0182476 filed in the Korean Intellectual Property Office on Dec. 23, 2020, the entire contents of which are incorporated herein by reference.

TECHNICAL FIELD

The present disclosure relates to a motor, and more particularly, to a motor capable of improving durability, stability, and reliability.

BACKGROUND

A hybrid vehicle or an electric vehicle, which is called an environmentally friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes stator cores provided by stacking electrical steel sheets, and stator coils wound around the stator cores.

A busbar is disposed at an upper side of the stator, and the stator coils are connected to an external power source through the busbar.

The busbar may be structured to include a plurality of terminals inside a ring-shaped holder, and the terminals may be constituted as a combination of phase terminals connected to U-phase, V-phase, and W-phase power sources, and a neutral terminal that connects the phase terminals.

The stator coils are fused with terminal parts of the terminals by being welded to the terminal parts of the terminals (e.g., welded by applying electric current) in a state in which the stator coils are compressed. After the terminal parts of the terminals are fused with the stator coils, an insulating material (e.g., epoxy) for insulation between the terminals is applied to cover the terminal parts of the terminals.

Meanwhile, when the motor vibrates or external impact is applied to the motor, the fused portion of the stator coil, whose strength becomes low, is damaged or separated from the terminal part of the terminal.

In particular, unlike an outermost peripheral portion of the holder (an outermost portion in a radial direction of the holder) to which a fastening member is fastened, an innermost peripheral portion of the holder (an innermost portion in the radial direction of the holder), on which the terminal part fused with the stator coil is disposed, is disposed in the form of a cantilever, which causes an increase in displacement of the innermost peripheral portion of the holder (the displacement of the innermost peripheral portion of the holder is larger than the displacement of the outermost peripheral portion of the holder) when vibration occurs. As a result, there is a problem in that the holder is vulnerable to vibration.

Therefore, recently, various studies have been conducted to improve durability, stability, and reliability of the coil, but the study results are still insufficient. Accordingly, there is a need to develop a technology to improve durability, stability, and reliability of the coil.

SUMMARY

The present disclosure has been made in an effort to provide a motor capable of improving durability, stability, and reliability.

In particular, the present disclosure has been made in an effort to minimize displacement of an innermost peripheral portion of a busbar, damage to a coil, and deterioration in durability when vibration occurs.

The present disclosure has also been made in an effort to reduce vibration and noise.

The present disclosure has also been made in an effort to simplify a structure and reduce costs.

The objects to be achieved by the embodiments are not limited to the above-mentioned objects, but also include objects or effects that may be understood from the solutions or embodiments described below.

An exemplary embodiment of the present disclosure provides a motor including: a stator including a plurality of split cores configured to collectively define a ring shape, and bobbins configured to respectively surround the plurality of split cores and each having a coil wound therearound; a busbar unit electrically connected to the coils; and support parts respectively disposed on the bobbins and configured to support the busbar unit.

This is to improve durability, stability, and reliability of the motor.

That is, in the related art, unlike an outermost peripheral portion of the holder (an outermost portion in a radial direction of the holder) to which a fastening member is fastened, an innermost peripheral portion of the holder (an innermost portion in the radial direction of the holder), on which the terminal part fused with the stator coil is disposed, is disposed in the form of a cantilever, which causes an increase in displacement of the innermost peripheral portion of the holder (the displacement of the innermost peripheral portion of the holder is larger than the displacement of the outermost peripheral portion of the holder) when vibration occurs. As a result, there is a problem in that the terminal holder part is vulnerable to vibration, and a fused portion of the coil, whose strength becomes low, is damaged or separated from the terminal part of the terminal.

However, according to the embodiment of the present disclosure, the busbar unit is supported by the support parts connected to the bobbins, which makes it possible to minimize an increase in displacement of the busbar unit. Therefore, it is possible to obtain an advantageous effect of minimizing the damage to and deformation of the coil and minimizing the separation of the coil from the terminal part when the motor vibrates or external impact is applied.

According to the exemplary embodiment of the present disclosure, the busbar unit may include: terminals electrically connected to the coils; and a holder configured to support the terminals, and the support parts may support the holder.

In particular, the busbar unit may be disposed above the stator, and the support parts may support a bottom surface of the holder.

The support part may have various structures capable of supporting the busbar unit on the bobbins.

For example, the support parts may at least partially support the bottom surface of the holder.

According to the exemplary embodiment of the present disclosure, the holder may have a contact zone with which a jig comes into contact, and a non-contact zone with which the jig does not come into contact, and the support parts may support the non-contact zone. Since the support part supports the non-contact zone with which the jig does not come into contact as described above, the support parts may support the holder without changing a structure of the jig for transporting and supporting the holder.

In particular, the support parts may integrally extend from the bobbins, respectively.

According to the exemplary embodiment of the present disclosure, the motor may further include: guide protrusions disposed on the support parts in a direction parallel to an axial direction of the stator; and a guide groove included in the busbar unit and configured to accommodate the guide protrusions.

The support parts are used to support the bottom surface of the holder and the guide groove accommodates the guide protrusions as described above, it is possible to inhibit a horizontal displacement of the holder relative to the bobbin while inhibiting an increase in displacement (vertical displacement) of the holder caused by vibration or the like. Therefore, it is possible to obtain an advantageous effect of more stably maintaining the arrangement state of the holder and more effectively inhibiting an increase in displacement of the holder.

In particular, the guide groove may extend in a continuous ring shape in a circumferential direction of the busbar unit. Since the guide groove extends in a continuous ring shape as described above, the guide protrusions may be assembled with the guide groove without being restricted by the positions of the guide protrusions with respect to the guide groove. Therefore, it is possible to obtain an advantageous effect of simplifying the process of assembling the guide protrusions and improving the assembly properties of the guide protrusions.

According to the exemplary embodiment of the present disclosure, the motor may further include: locking protrusions disposed on outer surfaces of the support parts, respectively; and a locking groove included in the busbar unit and configured to accommodate the locking protrusions.

As described above, in the state in which the locking protrusion is locked (accommodated) in the locking groove, the vertical movement of the holder relative to the bobbin may be inhibited, and the horizontal movement of the holder relative to the bobbin may be inhibited. Therefore, it is possible to obtain an advantageous effect of more effectively inhibiting an increase in displacement of the holder caused by vibration or the like.

In particular, the busbar unit may have an accommodation portion configured to accommodate at least a part of each of the support parts, and the locking groove may be disposed in an inner wall surface of the accommodation portion and extend in a continuous ring shape. Since the locking groove extends in a continuous ring shape as described above, the locking protrusions may be assembled with the locking groove without being restricted by the positions of the locking protrusions with respect to the locking groove. Therefore, it is possible to obtain an advantageous effect of simplifying the process of assembling the locking protrusions and improving the assembly properties of the locking protrusions.

According to the exemplary embodiment of the present disclosure, the motor may further include a bonding layer interposed between each of the support parts and the busbar unit.

The bonding layer may be disposed on one surface of each of the support parts, and each of the support parts and the busbar unit may be fixed by means of the bonding layer.

Since the support parts and the busbar unit are integrally fixed by means of the bonding layers as described above, the movement (the vertical and horizontal movements) of the holder caused by vibration or the like may be inhibited. Therefore, it is possible to obtain an advantageous effect of more effectively inhibiting an increase in displacement of the holder caused by vibration or the like.

DETAILED DESCRIPTION

Figure 1:
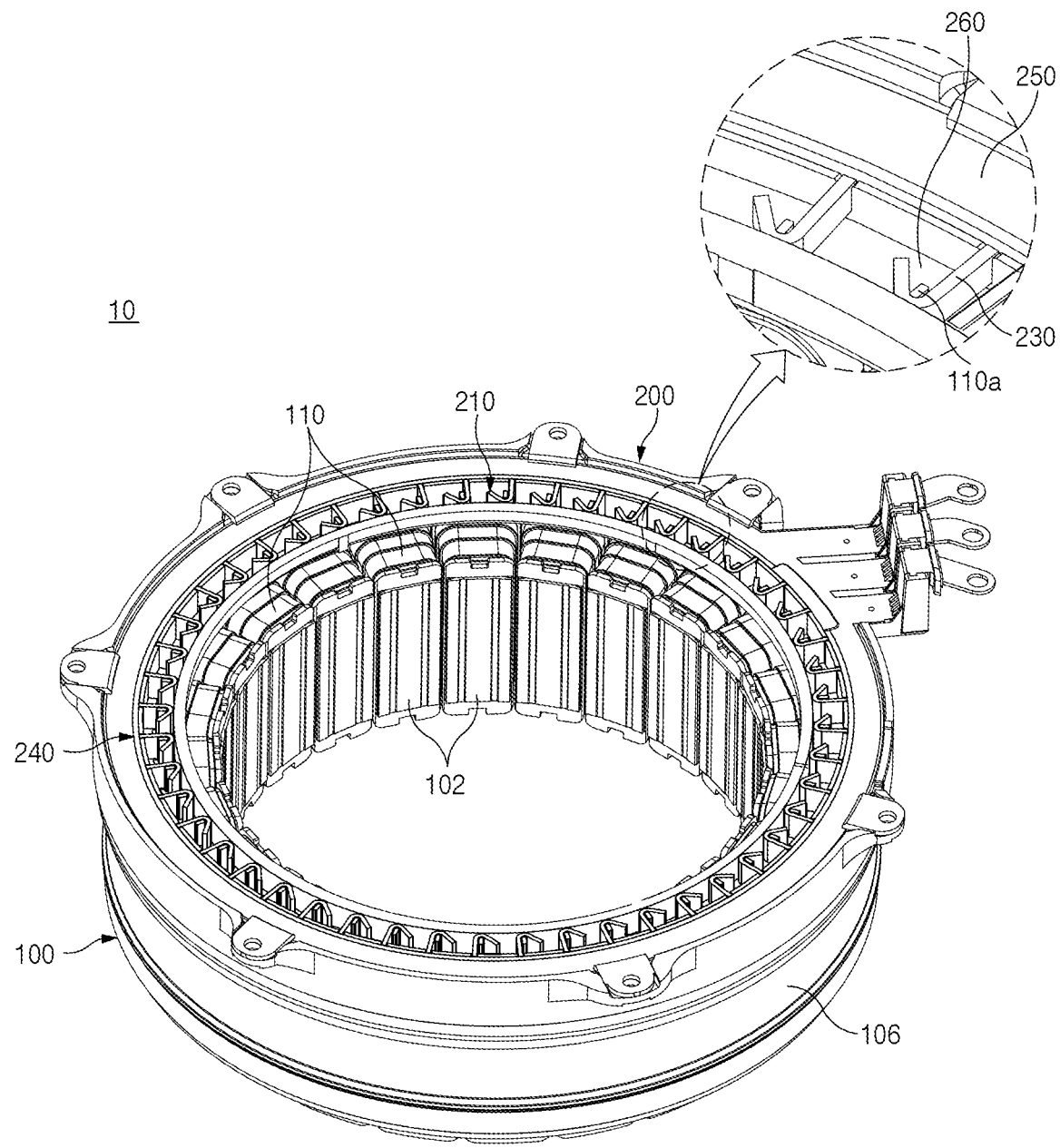
FIG. 1 is a view for explaining a motor according to an embodiment of the present disclosure.
Figure 2:
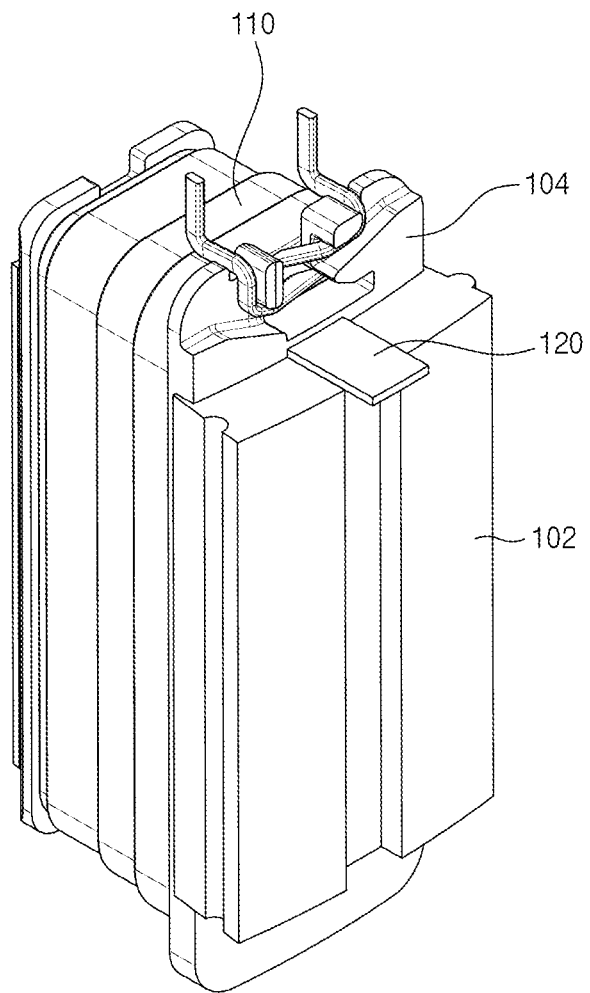
FIG. 2 is a view for explaining a split core and a bobbin of the motor according to the embodiment of the present disclosure.
Figure 3:
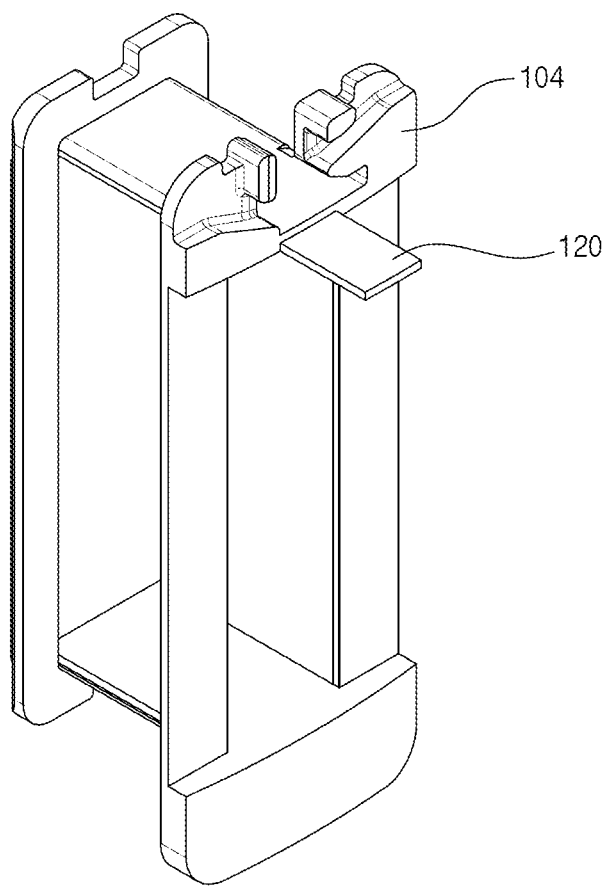
FIG. 3 is a view for explaining a support part of the motor according to the embodiment of the present disclosure.
Figure 4:
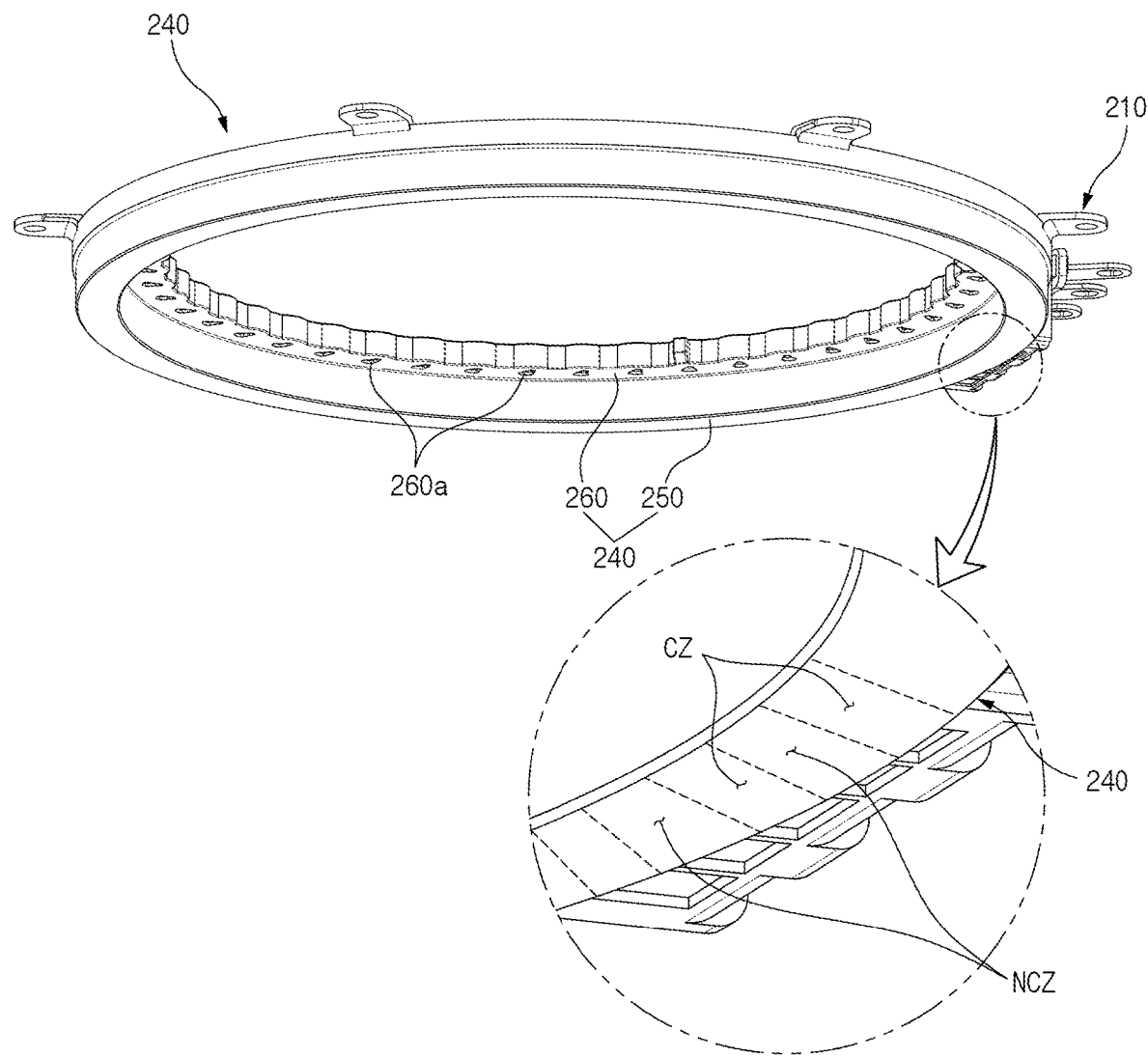
FIG. 4 is a view for explaining a busbar unit of the motor according to the embodiment of the present disclosure.
Figure 5:
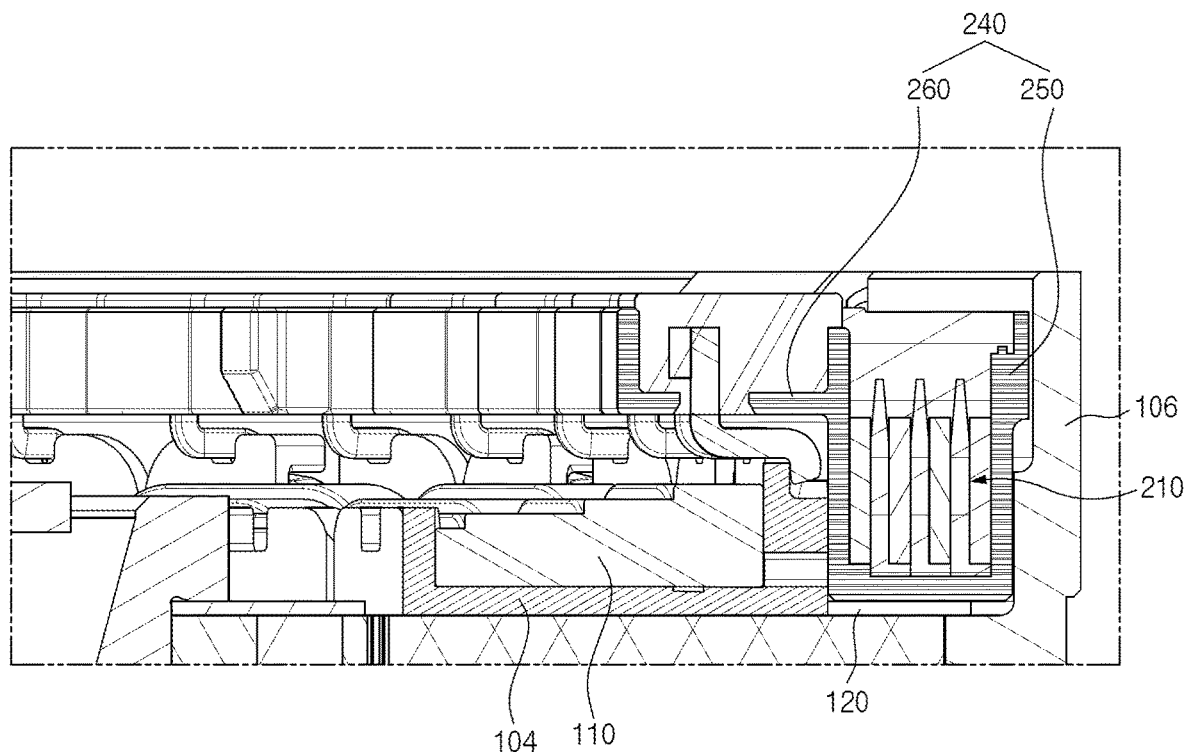
FIG. 5 is a view for explaining a state in which a holder is supported by the support part of the motor according to the embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 10, a motor 10 according to the embodiment of the present disclosure includes: a stator including a plurality of split cores 102 disposed to collectively define a ring shape, and bobbins 104 each configured to surround each of the split cores 102 and each having a coil 110 wound therearound; a busbar unit 200 electrically connected to the coils 110; and support parts 120 respectively disposed on the bobbins 104 and configured to support the busbar unit 200.

For reference, the motor 10 according to the embodiment of the present disclosure may be mounted in various subjects in accordance with required conditions and design specifications. The present disclosure is not restricted or limited by the type and structure of the subject.

For example, the motor 10 according to the embodiment of the present disclosure may be used as a drive motor for an environmentally friendly vehicle, such as a hybrid vehicle and/or an electric vehicle, which obtains driving power from electrical energy.

For example, the drive motor may be an inner-rotor-type synchronous motor and include the stator 100 seated on a housing, and a rotor (not illustrated) rotatably installed in the stator 100 with a predetermined air gap from the stator 100. The busbar unit 200 may be connected to the stator 100.

The stator 100 includes the plurality of split cores 102 disposed to collectively define a ring shape, and the bobbins 104 disposed to respectively surround the split cores 102 and each having the coil 110 wound therearound. The stator 100 may be accommodated in a housing (not illustrated).

The split core 102 may be variously changed in number and structure in accordance with required conditions and design specifications. The present disclosure is not restricted or limited by the number of split cores 102 and the structure of the split core 102.

For example, the split core 102 may be configured by stacking a plurality of electrical steel sheets in an axial direction of the rotor.

The bobbin 104 (made of plastic, for example) is provided around each of the split cores, and the coil 110 is wound around the bobbin 104.

According to the exemplary embodiment of the present disclosure, the stator 100 may include a support ring 106 disposed to surround outer peripheral surfaces of the plurality of split cores 102.

The support ring 106 is provided in the form of a hollow ring. The support ring 106 may be coupled to surround and be in close contact with the outer peripheral surfaces of the plurality of split cores 102.

For example, the support ring 106 may be coupled in a hot press-fit manner to surround the entire outer peripheral surfaces of the split cores 102. Further, the support ring 106 may be disposed to surround a part of a peripheral surface of a holder 240.

The rotor (not illustrated) is configured to be rotated by an electrical interaction between the rotor and the stator 100.

For example, the rotor may include a rotor core (not illustrated) and magnets (not illustrated). The rotor core may be structured by stacking a plurality of circular plates each provided in the form of a thin steel sheet or structured in the form of a bin.

A hole (not illustrated) may be formed at a center of the rotor, and a shaft may be coupled to the hole. Protrusions (not illustrated) may protrude from an outer peripheral surface of the rotor core and guide the magnets. The magnets may be attached to the outer peripheral surface of the rotor core and spaced apart from one another at predetermined intervals in a peripheral direction of the rotor core.

In addition, the rotor may include a can member (not illustrated) disposed to surround the magnets and configured to inhibit the separation of the magnets.

The busbar unit 200 is configured to electrically connect the external power source and the stator 100 (the coils of the stator).

For example, the busbar unit 200 may include terminals 210 electrically connected to the coils 110, and the holder 240 configured to support the terminals 210. The busbar unit 200 may be disposed above the stator 100.

The terminals 210 electrically connect the coils 110 of the stator 100 to an external power source.

According to the exemplary embodiment of the present disclosure, the terminal 210 may be at least one of phase terminals (a U-phase terminal, a V-phase terminal, and a W-phase terminal) respectively connected to a U-phase power source, a V-phase power source, and a W-phase power source and a neutral terminal for electrically connecting the phase terminals. For example, the busbar unit 200 may include a total of four terminals (the U-phase terminal, the V-phase terminal, the W-phase terminal, and the neutral terminal).

For example, the terminal 210 may include a body (not illustrated) accommodated in the holder 240, and terminal parts 230 protruding from an inner peripheral surface of the body and connected to the coils 110.

The body may be variously changed in structure and shape in accordance with required conditions and design specifications. For example, the body may have a single-layered structure and be provided as a band member in the form of an arc (or a ring) having a predetermined curvature.

According to another embodiment of the present disclosure, the body may have a double-layered structure (multi-layer structure) having a bent portion.

The terminal part 230 may be disposed on the inner peripheral surface of the body, and an end 110a of the coil 110 of the stator 100 may be connected to the terminal part 230.

The terminal part 230 may have various structures capable of being electrically connected to (e.g., fused with) the end 110a of the coil 110. The present disclosure is not restricted or limited by the structure and shape of the terminal part 230.

In addition, the terminal 210 may include a power terminal part (not illustrated) protruding from an outer peripheral surface of the holder 240.

The power terminal part extends from an outer surface of the body and protrudes from the outer peripheral surface of the holder 240. The power terminal part may be electrically connected to each of external power cables corresponding to the respective phases (the U-phase, the V-phase, and the W-phase).

The holder 240 supports the arrangement state of the terminals 210 and electrically insulates the terminals 210.

The holder 240 may have various structures capable of supporting the terminals 210. The present disclosure is not restricted or limited by the structure of the holder 240.

For example, the holder 240 may include a holder body 250 configured to support the bodies, and the terminal holder part 260 disposed on an inner peripheral surface of the holder body 250 and configured to allow the terminal parts 230 to be disposed (e.g., seated) thereon.

The holder body 250 may be variously changed in material and shape in accordance with required conditions and design specifications. The present disclosure is not restricted or limited by the material and shape of the holder body 250.

For example, the holder body 250 may be provided in the form of a hollow ring that surrounds the body. The holder body 250 may be configured as a molded product (made of an insulating material, for example) provided by injection molding.

The terminal holder part 260 is integrated with the inner peripheral surface of the holder body 250 and partially covers an upper region of the stator 100 (i.e., upper regions of the coils). The terminal holder part 260 supports the terminal parts 230.

For example, terminal holes 260a penetrate the terminal holder part 260. The end 110a of the coil 110 may pass through the terminal hole 260a and be electrically connected to the terminal part 230 disposed on an upper portion (based on FIG. 1) of the terminal holder part 260. The terminal hole 260a may have various structures through which the end 110a of the coil 110 may pass.

The terminal holder part 260 may have various structures capable of supporting the terminal parts 230. The present disclosure is not restricted or limited by the structure of the terminal holder part 260. For example, one end (an outer peripheral end) of the terminal holder part 260 may be fixed to the inner peripheral surface of the holder body 250, and the other end (an inner peripheral end) of the terminal holder part 260 may be provided in the form of a cantilever disposed as a free end.

In particular, the terminal holder part 260 may be integrated with the holder body 250 by injection molding. According to another embodiment of the present disclosure, the terminal holder part may be manufactured separately and then coupled to the holder body.

The support parts 120 are configured to support the busbar unit 200 on the bobbins 104 of the stator 100.

This is to minimize the displacement of an innermost peripheral portion of the busbar unit 200 (i.e., an innermost portion in the radial direction of the holder) and minimize damage to the coil 110 and a deterioration in durability of the coil 110 when vibration and impact occur.

That is, since the outermost peripheral portion of the holder (i.e., the outermost portion in the radial direction of the holder) is fixed by a fastening member (not illustrated), an increase in displacement of the outermost peripheral portion of the holder caused by vibration may be inhibited. In contrast, since the terminal holder part, which corresponds to the innermost peripheral portion of the holder, is provided in the form of a cantilever, the displacement of the terminal holder part is larger than the displacement of the outermost peripheral portion of the holder when vibration occurs. As a result, there is a problem in that the terminal holder part is vulnerable to vibration, and a fused portion of the coil, whose strength becomes low, is damaged or separated from the terminal part of the terminal.

However, according to the embodiment of the present disclosure, the busbar unit 200 is supported by the support parts 120, which makes it possible to minimize an increase in displacement of the busbar unit 200 (particularly, the terminal holder part) relative to the bobbin 104. Therefore, it is possible to obtain an advantageous effect of minimizing the damage to and deformation of the coil 110 and minimizing the separation of the coil 110 from the terminal part 230 when the motor 10 vibrates or external impact is applied.

The support part 120 may have various structures capable of supporting the busbar unit on the bobbin 104. The present disclosure is not restricted or limited by the structure of the support part 120.

For example, referring to FIGS. 2 to 5, the support part 120 may be integrated with the bobbin 104 and support a bottom surface of the holder 240 (e.g., a bottom surface of the holder body).

In this case, the configuration in which the support part 120 is integrated with the bobbin 104 may mean that the support part 120 integrally extends from the bobbin 104 or the support part 120 is coupled or connected to the bobbin 104.

In particular, the support part 120 may be integrated with the bobbin 104 by injection molding so that the support part 120 integrally extends from the bobbin 104.

Since the support part 120 and the bobbin 104 are integrated by injection molding as described above, a process of coupling the support part 120 and the bobbin 104 may be excluded. Therefore, it is possible to obtain an advantageous effect of simplifying a structure and an assembly process.

For example, the support part 120 may protrude rectilinearly from an inner surface of the bobbin 104 and have an approximately quadrangular plate shape. The support parts 120 may support the bottom surface of the holder 240 (e.g., the holder body).

According to another embodiment of the present disclosure, the support part may have a curved structure or other cross-sectional shapes.

In particular, the support parts 120 may be configured to partially support the bottom surface of the holder 240.

For example, the holder 240 may have a contact zone CZ with which a jig comes into contact, and a non-contact zone NCZ with which the jig does not come into contact. The support part 120 may support the non-contact zone NCZ.

Since the support part 120 supports the non-contact zone NCZ with which the jig does not come into contact as described above, the support parts 120 may support the holder without changing a structure of the jig for transporting and supporting the holder.

Figure 6:
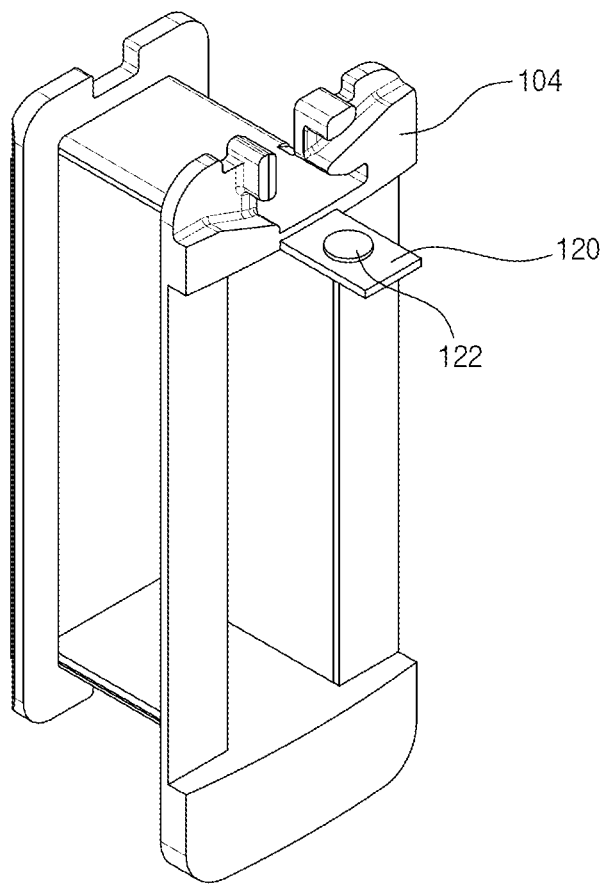
FIGS. 6 and 7 are views for explaining a guide protrusion and a guide groove of the motor according to the embodiment of the present disclosure.
Figure 7:
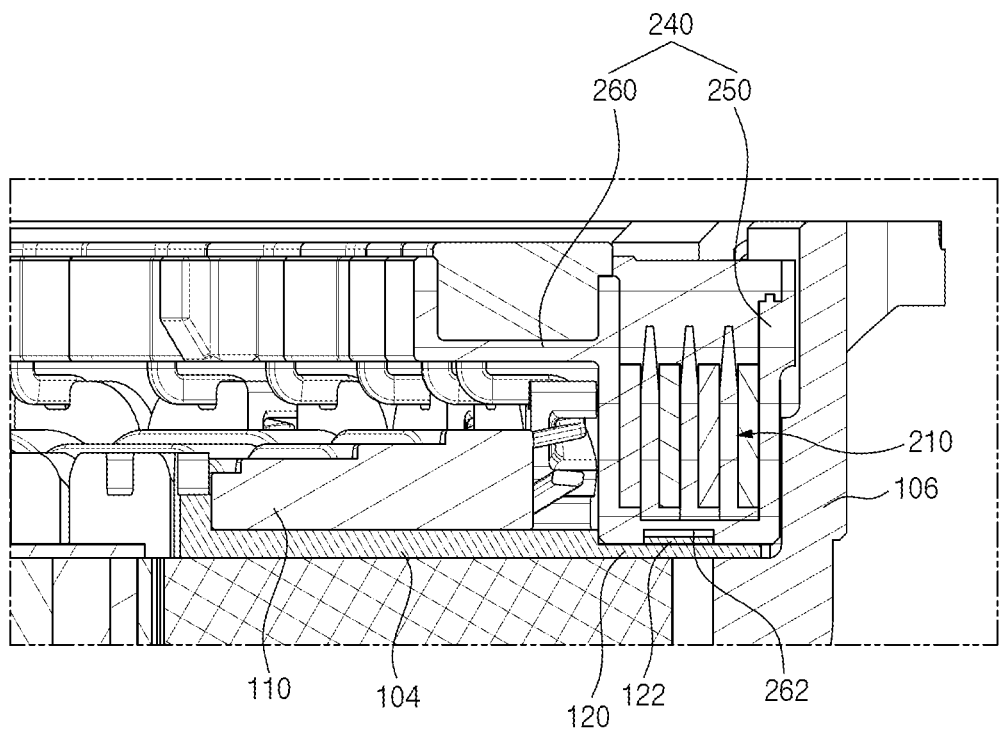

Referring to FIGS. 6 and 7, according to the exemplary embodiment of the present disclosure, the motor 10 may include guide protrusions 122 respectively disposed on the support parts 120 in an axial direction of the stator (in an upward/downward direction based on FIG. 6), and a guide groove 262 provided in the busbar unit and configured to accommodate the guide protrusions 122.

For example, the guide protrusion 122 may have a circular cross-section and be disposed on an upper surface (based on FIG. 6) of the support part 120. The guide groove 262 may be provided in the bottom surface of the holder and configured to accommodate the guide protrusions 122. According to another embodiment of the present disclosure, the guide protrusion may have a polygonal (e.g., quadrangular) cross-sectional shape or other cross-sectional shapes.

The support parts 120 are used to support the bottom surface of the holder 240 and the guide groove 262 accommodates the guide protrusions 122 as described above, it is possible to inhibit a horizontal displacement of the holder 240 relative to the bobbin 104 while inhibiting an increase in displacement (vertical displacement) of the holder 240 caused by vibration or the like. Therefore, it is possible to obtain an advantageous effect of more stably maintaining the arrangement state of the holder 240 and more effectively inhibiting an increase in displacement of the holder 240.

Moreover, when the posture and position of the guide protrusion 122 are misaligned with the guide groove 262, the guide protrusion 122 cannot be accurately inserted into the guide groove 262, and the holder 240 (the busbar unit) is disposed in an abnormal posture with respect to the housing. Therefore, an operator may easily recognize whether the busbar unit 200 is incorrectly assembled.

In particular, the guide groove 262 may be provided in the form of a continuous ring in the bottom surface of the holder 240 in a circumferential direction of the busbar unit (a circumferential direction of the holder). Since the guide groove 262 is provided in the form of a continuous ring as described above, the guide protrusions 122 may be assembled with the guide groove 262 without being restricted by the positions of the guide protrusions 122 with respect to the guide groove 262. Therefore, it is possible to obtain an advantageous effect of simplifying the process of assembling the guide protrusions 122 and improving the assembly properties of the guide protrusions 122.

Figure 8:
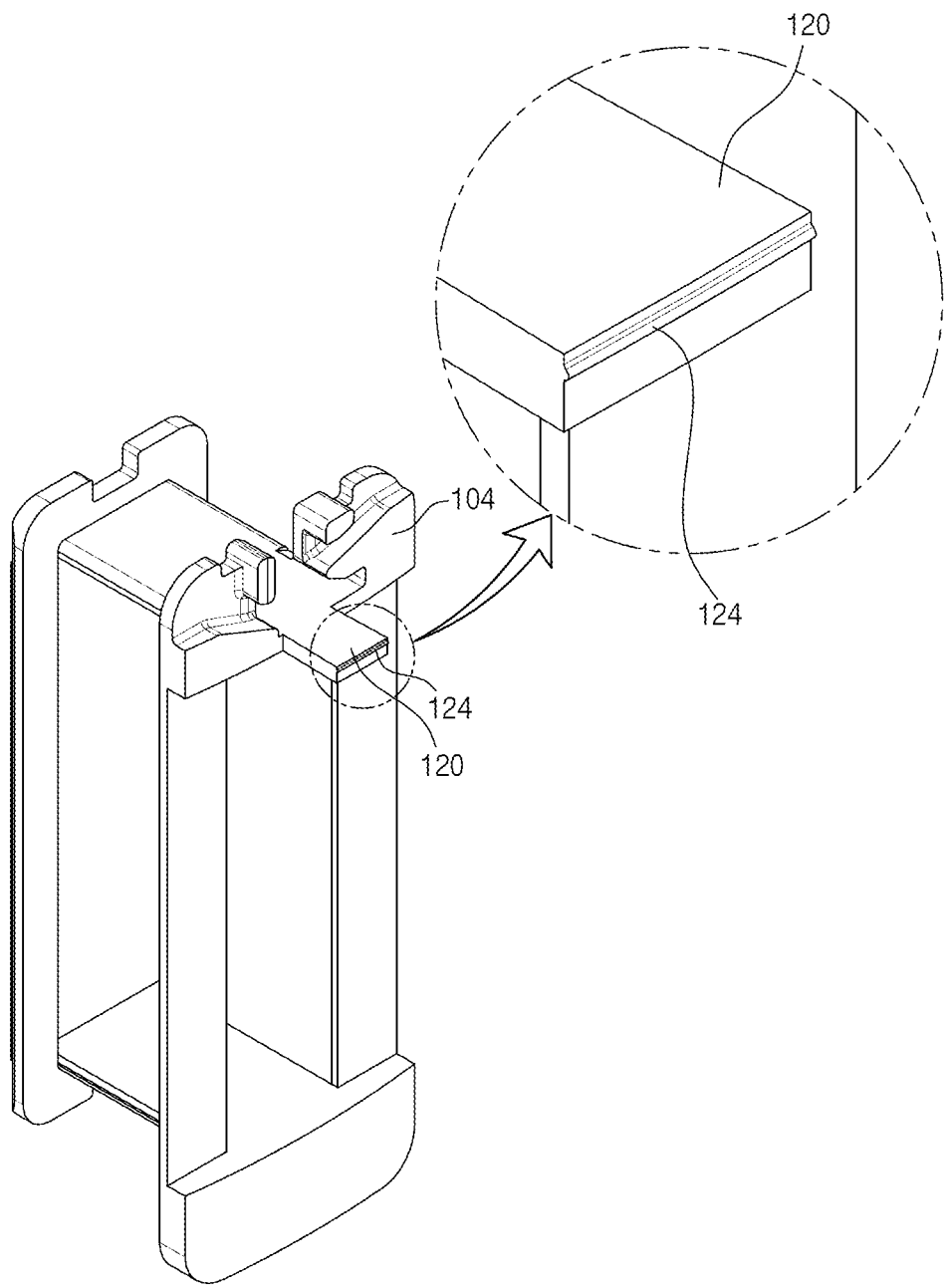
FIGS. 8 and 9 are views for explaining a locking protrusion and a locking groove of the motor according to the embodiment of the present disclosure.
Figure 9:
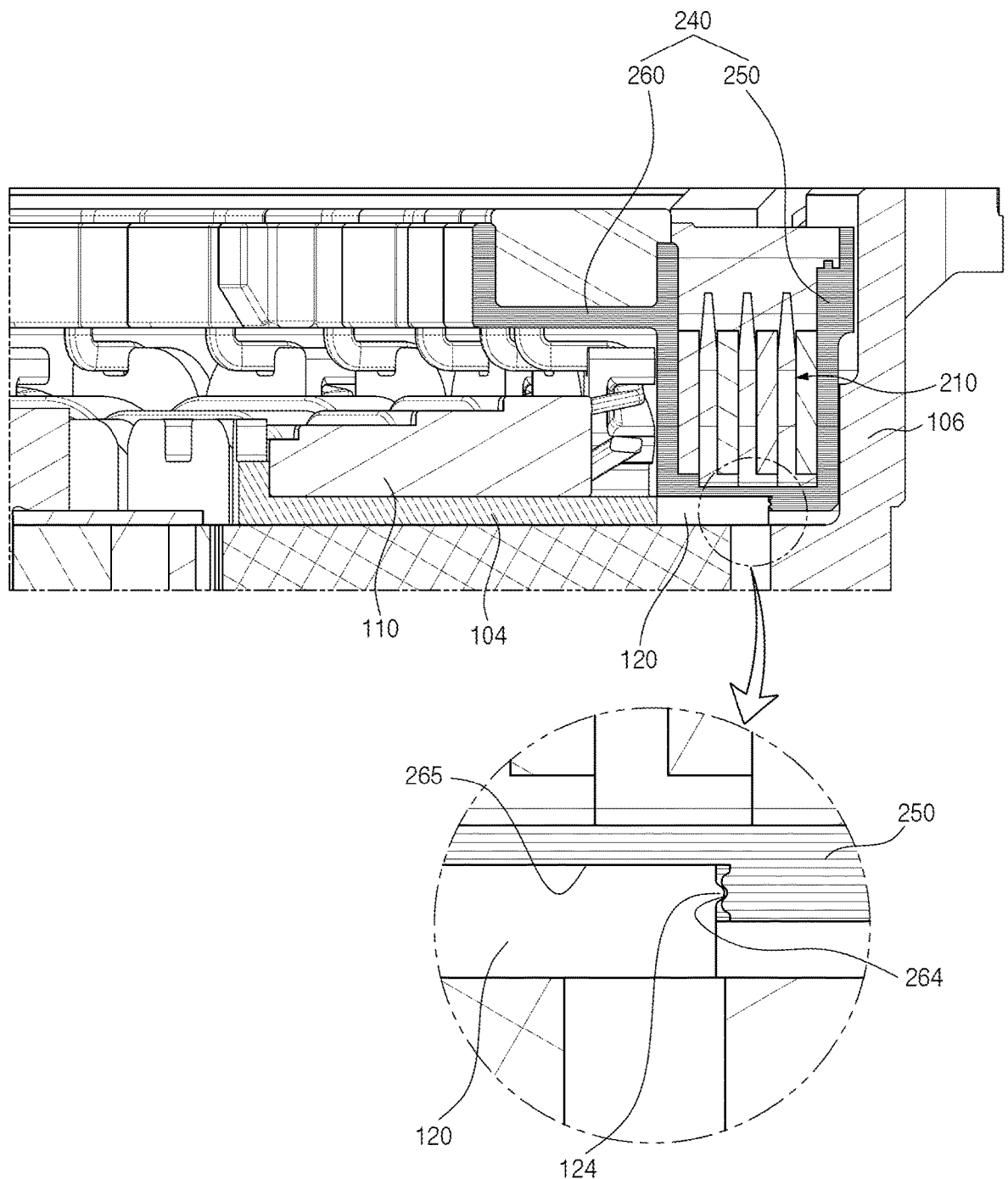

Referring to FIGS. 8 and 9, according to the exemplary embodiment of the present disclosure, the motor 10 may include locking protrusions 124 disposed on outer surfaces of the support parts 120, and a locking groove 264 provided in the busbar unit 200 and configured to accommodate the locking protrusions 124.

For example, the locking protrusion 124 may have an approximately semicircular cross-sectional shape. The locking groove 264 may have a semicircular cross-sectional shape corresponding to the shape of the locking protrusion 124.

As described above, in the state in which the locking protrusion 124 is locked (accommodated) in the locking groove 264, the vertical movement of the holder 240 relative to the bobbin 104 may be inhibited, and the horizontal movement of the holder 240 relative to the bobbin 104 may be inhibited. Therefore, it is possible to obtain an advantageous effect of more effectively inhibiting an increase in displacement of the holder 240 caused by vibration or the like.

In particular, an accommodation portion 265 may be provided in the busbar unit 200 (e.g., a lower portion of the holder body) and accommodate at least a part of each of the support parts 120. The locking groove 264 having a continuous ring shape may be provided in an inner wall surface of the accommodation portion 265. Since the locking groove 264 is provided in the form of a continuous ring as described above, the locking protrusions 124 may be assembled with the locking groove 264 without being restricted by the positions of the locking protrusions 124 with respect to the locking groove 264. Therefore, it is possible to obtain an advantageous effect of simplifying the process of assembling the locking protrusions 124 and improving the assembly properties of the locking protrusions 124.

More particularly, the support part 120 may be connected to be elastically deformable with respect to the bobbin 104. When the busbar unit 200 disposed above the bobbins 104 is pressed downward, the locking protrusions 124 may be elastically fastened to the locking groove 264 in a snap-fit fastening manner.

Figure 10:
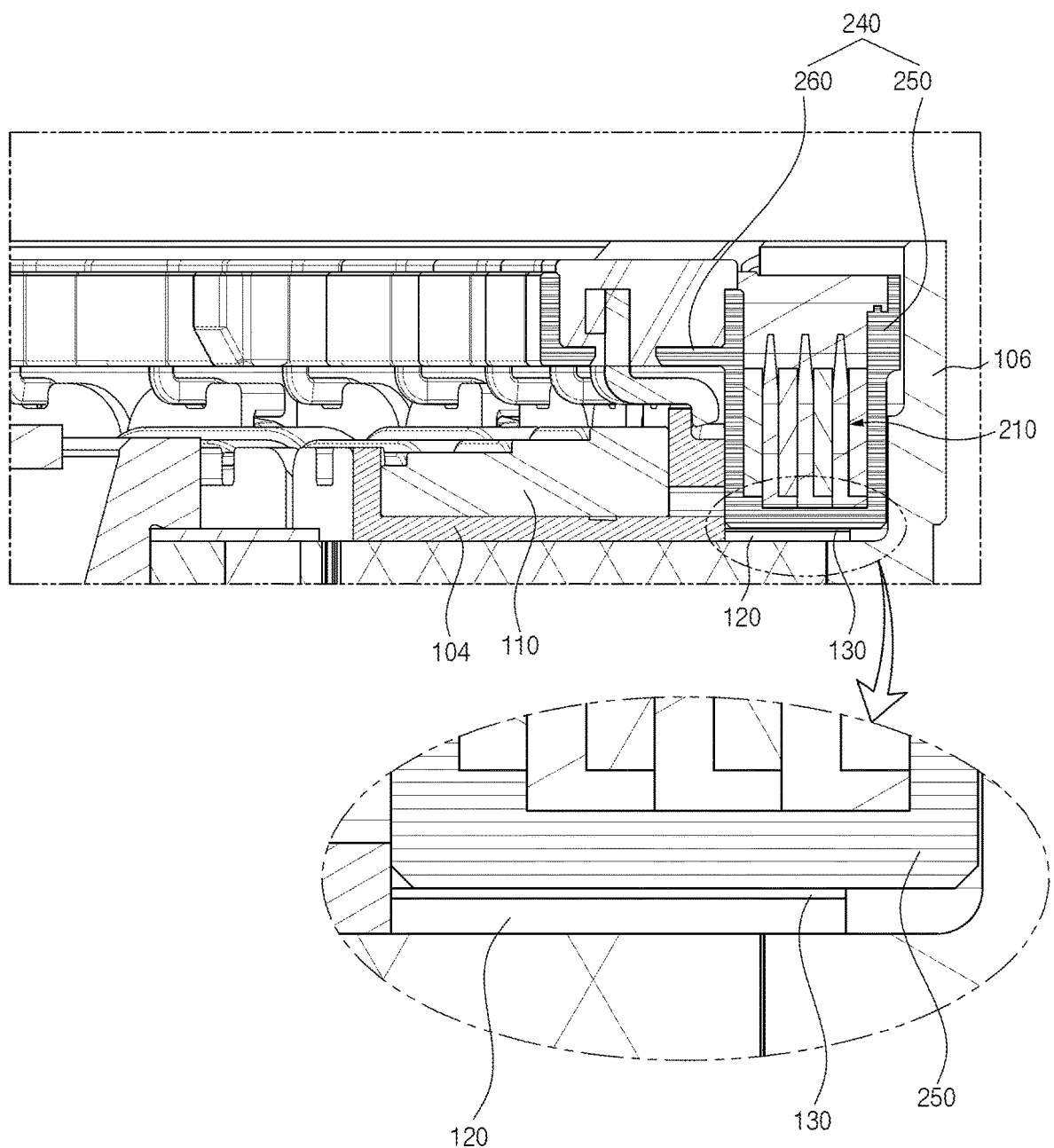
FIG. 10 is a view for explaining a bonding layer of the motor according to the embodiment of the present disclosure.

Referring to FIG. 10, according to the exemplary embodiment of the present disclosure, the motor 10 may include bonding layers 130 interposed between the support parts 120 and the busbar unit 200 (e.g., the holder body).

For example, the bonding layer 130 may be disposed on one surface of the support part 120. The support part 120 and the busbar unit 200 may be fixed by means of the bonding layer 130. According to another embodiment of the present disclosure, the bonding layer may be provided on the bottom surface of the holder body.

The bonding layer 130 may be made of various adhesive materials (e.g., epoxy) capable of fixing the support part 120 and the busbar unit. The present disclosure is not restricted or limited by the material and properties of the bonding layer 130.

Since the support parts 120 and the busbar unit 200 are integrally fixed by means of the bonding layers 130 as described above, the movement (the vertical and horizontal movements) of the holder 240 caused by vibration or the like may be inhibited. Therefore, it is possible to obtain an advantageous effect of more effectively inhibiting an increase in displacement of the holder 240 caused by vibration or the like.

According to the embodiment of the present disclosure described above, it is possible to obtain an advantageous effect of improving durability, stability, and reliability.

In particular, according to the embodiment of the present disclosure, it is possible to obtain an advantageous effect of minimizing the displacement of the busbar unit and minimizing the damage to the coil and a deterioration in durability of the coil when vibration and impact occur.

In addition, according to the embodiment of the present disclosure, it is possible to obtain an advantageous effect of reducing vibration and noise.

In addition, according to the embodiment of the present disclosure, it is possible to obtain an advantageous effect of simplifying the structure and reducing the costs.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A motor comprising:
  a stator comprising a plurality of split cores configured to collectively define a ring shape, and bobbins configured to respectively surround the plurality of split cores and each having a coil wound therearound;
  a busbar unit electrically connected to the coils; and
  support parts respectively extending radially outwardly from the bobbins and configured to support the busbar unit,
  wherein the busbar unit comprises:
    terminals electrically connected to the coils; and
    a holder configured to support the terminals,
  wherein the holder comprises:

a holder body supporting a bottom surface of a body of each terminal; and a terminal holder part protruding from an inner peripheral surface of the holder body, wherein the terminals are disposed on the holder body, and the holder body is disposed on the support parts.

2. The motor of claim 1, wherein the busbar unit is disposed above the stator, and the support parts support a bottom surface of the holder.

3. The motor of claim 2, wherein the support parts at least partially support the bottom surface of the holder.

4. The motor of claim 3, wherein the holder has a contact zone with which a jig comes into contact, and a non-contact zone with which the jig does not come into contact, and the support parts support the non-contact zone.

5. The motor of claim 1, wherein the support parts integrally extend from the bobbins, respectively.

6. The motor of claim 1, further comprising:
guide protrusions disposed on the support parts in a direction parallel to an axial direction of the stator; and
a guide groove included in the busbar unit and configured to accommodate the guide protrusions.

7. The motor of claim 6, wherein the guide groove extends in a continuous ring shape in a circumferential direction of the busbar unit.

8. The motor of claim 1, further comprising:
locking protrusions disposed on outer surfaces of the support parts, respectively; and
a locking groove included in the busbar unit and configured to accommodate the locking protrusions.

9. The motor of claim 8, wherein the busbar unit has an accommodation portion configured to accommodate at least a part of each of the support parts, and the locking groove is defined on an inner wall surface of the accommodation portion.

10. The motor of claim 8, wherein the locking groove extends in a continuous ring shape in a circumferential direction of the busbar unit.

11. The motor of claim 1, further comprising:
a bonding layer interposed between each of the support parts and the busbar unit.

12. The motor of claim 11, wherein the bonding layer is disposed on one surface of each of the support parts, and each of the support parts and the busbar unit are fixed by means of the bonding layer.

13. The motor of claim 1, wherein the terminal holder part is integrated with the inner peripheral surface of the holder body and partially covers an upper region of the coils.

14. The motor of claim 13, wherein the terminal holder part includes terminal holes through which respective ends of the coils pass to be electrically connected to the terminal parts, respectively.

15. The motor of claim 1, wherein each terminal includes a body and terminal parts protruding from an inner peripheral surface of the body and connected to the coils, wherein the terminal parts are seated on the terminal holder part.

* * * * *